United States Patent [19]

Buchanan

[11] 4,136,131
[45] Jan. 23, 1979

[54] EXTRACTION OF RUBBER OR RUBBERLIKE SUBSTANCES FROM FIBROUS PLANT MATERIALS

[75] Inventor: Russell A. Buchanan, Peoria, Ill.

[73] Assignee: The United States of America as represented by the Secretary of Agriculture, Washington, D.C.

[21] Appl. No.: 891,953

[22] Filed: Mar. 31, 1978

[51] Int. Cl.$^2$ .............................................. C08C 4/00
[52] U.S. Cl. ................................................ 260/816 G
[58] Field of Search .......................................... 260/816

[56] References Cited

U.S. PATENT DOCUMENTS

| 979,902 | 12/1910 | Van Der Linde | 260/816 |
|---|---|---|---|
| 982,373 | 1/1911 | Lawrence | 260/816 |
| 1,159,137 | 11/1915 | Veccheni | 260/816 |
| 1,614,541 | 1/1927 | Smith | 260/816 |
| 1,671,570 | 5/1928 | Carnahan | 260/816 |
| 1,695,676 | 12/1928 | Yeandle | 260/816 |
| 2,281,336 | 4/1942 | Stacom | 260/816 |
| 2,434,412 | 1/1946 | Jones | 260/821 |
| 2,459,369 | 1/1949 | Tint et al. | 260/818 |

Primary Examiner—Stanford M. Levin
Attorney, Agent, or Firm—M. Howard Silverstein; David G. McConnell; Curtis P. Ribando

[57] ABSTRACT

Fibrous plant materials, such as from the Guayule shrub, which contain rubber or other rubberlike polymeric hydrocarbons, are subjected to the simultaneous action of compressive and shear forces to reduce them to a coherent, shaped plastic mass, thereby enabling efficient and economical solvent extraction of the rubber or rubberlike hydrocarbons.

6 Claims, No Drawings

EXTRACTION OF RUBBER OR RUBBERLIKE SUBSTANCES FROM FIBROUS PLANT MATERIALS

BACKGROUND OF THE INVENTION

1. Field of the Invention

This invention relates to processes for preparation of plant materials for solvent extraction. More specifically, the invention relates to the preparation of fibrous plant materials such as Guayule shrub for solvent extraction of rubber, rubberlike polymeric hydrocarbons, resins, and related materials.

2. Description of the Prior Art

The usual natural rubber of commerce is obtained by tapping the Hevea rubber tree (*Hevea brasiliensis*), collecting its latex, and coagulating the latex to obtain rubber. Other hydrocarbon polymers are, or have been, obtained from other plant species in the same way. Neither Hevea nor any other lactiferous rubber-bearing tree can be practically grown in the United States. However, there has been recent interest in growing *Euphorbia tirucalli* and other similar and related plants in arid regions of the United States. This and other such plants produce latices which contain little or no rubber but are rich in hydrocarbons, and they have been referred to as "gasoline trees". *Euphorbia tirucalli* could be tapped for latex as Hevea is; but tapping of trees and collecting of latex is labor-intensive and prohibitively expensive in countries with advanced economies. Other lactiferous plants of interest for their rubber or hydrocarbons, i.e., various species of Apocynaceae, Asclepiadaceae, Euphorbiaceae, and Moraceae are small herbaceous plants too small for tapping. Yet other rubber- and hydrocarbon-bearing plants, mostly Compositae and Labiatae, are not lactiferous. Thus, future green plant production of rubber and hydrocarbons in the United States will involve extraction processes more like those applicable to Guayule (*Parthenium argentatum*) than those applicable to Hevea.

Guayule is one of many nonlactiferous rubber-bearing plants. It has served as an important source of rubber in the past and interest in it has recently revived. The prehistoric native process for extracting rubber from Guayule was to chew pieces of shrub, expectorate fibrous matter and retain gummy matter until a mass of resinous rubber accumulated in the mouth. Consolidation of many chewing-gum sized pieces provided enough material for rubber balls and other articles.

It is significant that the most modern process for extracting rubber from Guayule (as practiced in a pilot plant at Saltillo, Coahila, Mexico, and described in detail by the National Academy of Sciences booklet "Guayule: An Alternative Source of Natural Rubber") is practically a scaled-up industrialized version of the primitive native process described above. Mastication by chewing is replaced by wet-milling with a Bauer mill to consolidate the resinous rubber into "worms" which are separated from fibrous matter by flotation. Antecedent to wet-milling, lush Guayule shrub is parboiled to coagulate rubber and aid in removing leaves, then hammermilled to coarse pieces. Subsequent to the wet-milling and separation of bark and wood, the rubber "worms" are deresinated by acetone extraction and purified by dissolving in cyclohexane and filtering or centrifuging. These main processing steps and several auxiliary operations make up the current complicated separation process for winning rubber from Guayule.

The Saltillo process is essentially the same as that described in U.S. Pat. No. 2,434,412. It is also similar to the process taught in U.S. Pat. No. 2,459,369 except that deresination of the "worms" results in a lower recovery of resin than in the patent process of deresinating the whole plant material. Solution phase purification in the Saltillo process also provides a rubber product lower in insoluble fibrous matter.

A few other rubber-bearing plants have been processed experimentally in a manner similar to that described above. These include Russian Dandelion (*Taraxacum Kok-saghyz*), Rabbit-Brush (*Crysothamnus nauseousus*), Milkweed (*Asclepias syriaca*), and other species. Russian Dandelion was found very amenable to a wet-milling extraction process similar to that for Guayule, but such processes are impractical for many other species.

Those skilled in the art have long recognized that direct solvent extraction of rubber from Guayule seems to offer many advantages over wet-processing. The primary advantage would be elimination of many processing steps including parboiling and/or pressure cooking; wet-milling; addition of acid, alkali, surfactants, etc.; flotation; water washing; and several drying and purification steps. Subsidiary advantages to be expected from solvent extraction in comparison to wet-processing are large savings in process water (Guayule grows and is processed in arid regions), improved resin yields, lower heavy-metal contamination of the rubber and the provision for solution-phase purification as an integral component of the operation. However, solvent extraction of rubber from Guayule, though often studied, has been found completely impractical on an industrial scale, heretofore. In fact, the earliest industrial processes for Guayule were based on solvent extraction but were found impractically difficult and expensive and were replaced by wet-milling techniques, see U.S. Pat. No. 982,373. A solvent extraction is contemplated in U.S. Pat. No. 1,695,676 wherein the cell walls of the Guayule are first broken down by penetrating the plant material with high pressure gas and suddenly releasing it to effect an instantaneous expansion. The advantages of this process are diminished by the expense of the requisite high pressure equipment and the inherent inefficiency of a batch-type procedure. Moreover, the porous fibers result in a substantial solvent holdup and tend to clog the extraction equipment. Recently, in Mexican studies, methods for extraction of rubber from Guayule were extensively reevaluated with solvent extraction again being rejected on practical grounds and the modern wet-milling process described above being adopted.

As is well known, the fundamental problem in solvent extraction of rubber from plant materials is that rubber is a high molecular weight polymer unable to pass cell walls and membranous tissue in solution. Such plant structures are analogous to osmotic or dialytic membranes in that low molecular weight polymers, hydrocarbons, oils, etc. are able to pass but not large polymeric molecules. Thus, in order to accomplish solvent extraction of rubber, the plant structure has to be very thoroughly disrupted. In analytical procedures, this is usually accomplished by fine grinding, for example by hammermilling through a 40-mesh screen. The resulting fine powders can be extracted in reasonable lengths of time with sophisticated laboratory equipment in small quantities. However, they present insurmountable difficulties to scale-up including very low drainage rates and high solvent hold-up. These difficulties result in impractically slow extraction and very large solvent losses in pilot-plant or larger scale operations.

Experimentally, on laboratory and pilot-plant scales, rubber has been solvent extracted from leaves of Leavenworth Goldenrod (*Solidago leavenworthii*), Rubbervine (*Cryptostegia grandiflora*), and a few other species. Solvent extraction of such leaf tissue presents the same difficulties found for whole-plant Guayule, but there is no alternative since the wet-processing method is inapplicable to leaves of low rubber content. Thus, the economic penalty associated with prior art solvent extraction of rubber from plant materials contributed strongly to the past failure of, and current disinterest in, the Leavenworth Goldenrod as a domestic United States source of natural rubber even though a considerable investment was made toward developing this species as a crop because of its good horticultural properties.

Solvent extraction is a preferred process for winning oils and fats from seeds. Since such monomeric substances as triglyceride oils can be extracted through intact membranous tissue, much less severe treatment is necessary to provide a suitable substrate for extraction. Commonly, oilseeds are prepared for solvent extraction by cracking and decorticating to remove fibrous seedcoats then compressing to flakes on rolls employing relatively low pressures and little or no shear. The storage tissues of seed are soft and much lower in compressive or tensile strength than the woody and fibrous plant tissues found in wood, stem, bark and leaf, for example. Thus, while the process of flaking oilseeds superficially resembles one embodiment of the instant invention, both the processing and equipment are inapplicable to rubber-containing, fibrous plant materials.

SUMMARY OF THE INVENTION

I have unexpectedly found that fibrous plant materials containing rubber or other rubberlike polymeric hydrocarbons can be efficiently and economically extracted with solvent by the following process:
  a. subjecting said plant materials to the simultaneous action of compressive and shear forces under nonaqueous conditions, wherein said forces are sufficient to reduce said fibrous plant material to comminuted fibrous matter and released polymeric hydrocarbon substances and to cause the comminuted fibrous matter and polymeric hydrocarbon substances to cohere into a plastic mass, thereby producing said plastic mass;
  b. shaping the plastic mass into particles;
  c. extracting the polymeric hydrocarbon substances from the shaped particles with a solvent; and
  d. recovering the polymeric hydrocarbon substances.

In accordance with this process, it is a primary object of the invention to produce from fibrous rubber-containing plant materials shaped particles which have the novel advantage that they may be optimally and economically solvent extracted in any of the several commercial extractors with complete recovery of rubber, resins, and related hydrocarbons. It was surprisingly found that these shaped particles have sufficient strength and coherence to remain intact throughout the extraction process even after all the polymeric substances which serve as binding agents have been removed.

Another object of the invention is to find an alternative for the complicated wet-milling procedure for extracting rubber from plant material.

It is also an object of the invention to provide increased yields of rubber and other hydrocarbons over those obtained by prior art extraction methods.

DETAILED DESCRIPTION OF THE INVENTION

The term "rubber" is defined herein in its normal sense as the elastic naturally occurring hydrocarbon polymer of cis-1,4-isoprene, such as that obtained from *Hevea brasiliensis*. "Rubberlike polymeric hydrocarbons" is used herein to refer to naturally occurring nonrubber hydrocarbon polymers such as gutta-percha and balata. These are also polymers of isoprene. "Polymeric hydrocarbon substances" is used herein generically to refer to both rubber- and rubberlike polymeric hydrocarbons.

als containing rubber or other rubberlike polymeric hydrocarbons in an amount sufficient to serve as an adequate binder for its fibrous matter. The minimum polymeric hydrocarbon content varies with plant species and with plant component within a species because of the consequent variation in both hydrocarbon type and fiber nature. For Guayule, it is best to employ the whole plant, and a minimum of about 2% rubber with about 4% resin are required. In general, lower rubber contents can be tolerated if nonrubber hydrocarbon and resin contents are higher. In some instances, it may be desirable to achieve optimum compositions by blending plant components in a desirable ratio; for example, there may be an advantage to adding some of the stem of low rubber content to Goldenrod leaf of about 5% rubber content since the stem fiber improves extraction characteristics of the resulting shaped particles. Similarly, there may also be an advantage to adding, as recyclable binders, rubber, hydrocarbon, or resin from prior extractions to plant material marginally low in these components. The invention does not apply to plant produce which is very low in polymeric hydrocarbons so that coherent particles cannot be formed. Thus, the invention has not yet been found applicable to usual oilseeds and to pine needles even though these materials are rich in hydrocarbon-like liquid oils. There is, of course, no upper limit to the amount of rubber or other polymeric hydrocarbon that may be present.

The invention may be practiced with a large number of plant species bearing rubber and rubberlike hydrocarbons including particularly Guayule (*Parthenium argentatum*), Rabbit-Brush (*Crysothamnus nauseousus*), Rubbervine (*Cryptostegia grandiflora*), Milkweeds (*Asclepias incarnata, sublata, syriaca, et al.*), Goldenrods (*Solidago altissima, graminifolia, leavenworthii, rigida, et al.*), Dandelions (*Taraxacum Kok-saghyz, khrim-saghyz, et al.*), Sow Thistles (*Sonchus arvensis, oleraceous, et al.*), Rosin Weeds (Silphium species), Mountain Mints (Pycnanthemum species), and *Cacalia atriplicifolia*. Many other plants which produce rubber and rubberlike hydrocarbons are known, particularly among the Compositae, Euphorbiaceae, Labiatae, and Moraceae and it is possible that the invention will be found applicable to most of these species also; particularly if plant breeders succeed in current efforts to develop for some of these species new varieties high in hydrocarbon and rubber contents.

The compressive and shear forces required for purposes of this invention are dependent upon several interrelated factors including the species of plant material, its moisture, fiber, and polymeric hydrocarbon content, the equipment for applying the forces, the equipment adjustments, temperature, and the like. However, for any given set of such factors, the combination of compressive and shear forces must be sufficient to reduce fibrous plant materials to comminuted fibrous matter and released polymeric hydrocarbon substances, and to cause this fibrous matter and polymeric hydrocarbons to cohere into a plastic mass. "Plastic" is used herein to mean "capable of being shaped or formed; pliable." Without desiring to be bound to any particular numerical values, the compressive forces will generally be in the range of 1,000–10,000 p.s.i.a., the shear rates in the range of 100–1,000 sec.$^{-1}$, and the shear stresses in the range of 15–1,450 p.s.i.a. It is understood that in accordance with the objectives of the invention, the application of these forces must be under nonaqueous conditions; that is, in the absence of added process water.

One economical and effective way to simultaneously apply high shear and compressive forces to plant materials is by use of an ordinary rubber mill, i.e., a differential roll mill where high shear forces are produced by operating parallel smooth rolls independently at different speeds, and high compression is produced by having a positively controlled small nip opening between the rolls. For processing extracted rubber, such rolls are usually operated at a friction ratio of 1.4 with a front roll speed of 24 r.p.m. and a back roll speed of 34 r.p.m., and with a variable nip opening of from 0.050 inch to 0.500 inch. When operated with smaller nips, rubber rolls generate very large shear and compressive forces and are easily capable of producing greater deformation of woody materials than is produced by a pure compressive force of 5,000 p.s.i. in an ordinary hydraulic press. For purposes of this invention, nip openings of 0.001 inch to 0.020 inch are employed with friction ratios of 1.1 or higher and slow roll speeds greater than 10 r.p.m. using any ordinary rubber roll with positively controlled (screw adjusted) nip. While corrugated rolls may be useful in preliminary treatments of plants, they do not supply sufficient compressive or shear forces for purposes of the invention. Likewise, rolls without positive control of the nip (for example, weight-compressed or spring-loaded callendar rolls) generally do not provide high enough compression at small enough openings to be useful in the practice of this invention.

When suitable rubber-bearing plant material is fed to a mill under the above-specified conditions, the cell walls of the fibrous plant material are ruptured, thereby releasing the polymeric hydrocarbon substances and comminuting the fibrous matter. For best results, it is preferred that the starting material be in chopped form. This material can be banded onto the mill after one or several passes and mixed in a manner similar to an elastomer or polymer. Mixing is continued until the polymeric hydrocarbon substances cement the fibrous matter into a coherent plastic mass. After mixing to homogeneity the mass can be removed as a shaped sheet or as large flakes with a doctor knife. The degree of mixing and other properties of the plant material can be closely controlled by the machine operator by manipulating such variables as roll speed (on variable speed mills), nip opening, mixing time, and temperature. Preferred temperatures are in the range from 25° C. to 100° C., though it is understood that any temperature which does not degrade the polymeric hydrocarbons could be used. Another variable which has some effect is moisture content of the starting plant material. It is preferably to employ air-dry plant produce of from 5 to 20% moisture content. For plant materials of higher moisture content, it is desirable to use temperatures in the upper part of the range to accomplish partial drying during the processing. Various combinations of mixing conditions as within the skill of a person in the art can be devised enabling the production of optimum flakes or other shaped forms for extraction.

Another economical and effective way to simultaneously apply shear and compressive forces to the fibrous plant materials is by use of an ordinary single-screw extruder operated at temperatures of from about 25°–95° C. Such extruders subject materials to high pressures internally and to high shear at screw flights and at extrusion through the die. They offer advantages over rubber mills in that their through-put is high and that precisely shaped particles may be prepared by extrusion through shaped dies and chopping to length. The resultant ribbon-flakes or fine pellets are very free-draining upon extraction. Wet plant material having a moisture content in the range of about 20–40% may be advantageously used as feed for an extruder having a vacuum-vented compound screw. The barrel and screw upstream from the vent may be operated above 100° C. to obtain further disruption of cell membranes upon expansion of steam at exit from the vent. The barrel, screw, and die downstream from the vent are then operated at less than 100° C. to yield a compact coherent pellet. Generally, temperature control is easier with an extruder than with rolls and higher temperatures may be used since there is much less exposure of plant material to air during the operation. A wide range of variables are subject to manipulation by the extruder operator to produce optimum particles for the subsequent extraction step. For a given machine, variables, in addition to moisture content of feed, include screw speeds, screw design, die design, and barrel, screw, and die temperatures. In general, optimum conditions can only be specified by way of example as they vary with both feed material and machine design. For Guayule, 2.5:1 to 25:1 length to diameter single-screw extruders with high-torque drive units operated with 1/1 to ⅓ compression ratio screws, screw speeds of 25–200 r.p.m., barrel and die temperatures of 25° C. to 200° C., ¼-inch rod or spaghetti dies or a 0.050-inch ribbon die and a die cutter give advantageously shaped particles. High-torque drive units are required because the power requirements for extrusion of fibrous and woody plant produce is high relative to extrusion of thermoplastics and rubber. Generally, the higher the plant produce is in rubber plus resin content, the less power required to form optimum particles. Thus, it is particularly advantageous to use high rubber content Guayule for extrusion processing.

The invention may also be practiced with a wide variety of other machines designed to accomplish high shear mastication at high pressure. Examples of suitable machines include the various commercially available twin-screw, reciprocating-screw, and ram-operated extruders and continuous mixer-extruders; various high shear internal mixers of the Banbury and Transfermix types; and various differential roll configurations.

There is often an advantage to the employment of two or more of the above types of machines in sequence. For example, a roll-mill may be used to shear, compress, and consolidate plant materials into a flake which may then be extruded to reshape the particles. Generally, the shear-compression step and the ultimate shaping step may be performed either simultaneously or else sequentially in one or more machines.

Some hydrocarbon- and rubber-bearing plants, Asclepias and Apocynum species, for example, have good quality best fibers. By careful adjustment of operating parameters as determinable by a person in the art, it is possible to form particles suitable for efficient solvent extraction without destroying the fiber utility so that the resulting solvent-extracted particles can be pulped for papermaking.

tion illustrates a prior art attempt to gain a fast-draining low solvent hold-up extraction substrate.

Each of the above five portions were sequentially extracted first with acetone to remove resin, then with cyclohexane to remove rubber. An ordinary Soxhlett extractor was employed and operated for a time of 24 hours per solvent. Extraction parameters and product yields are given in Table I.

Table I

| | | Extraction parameters | | | Resin yield, % | Rubber yield, % |
|---|---|---|---|---|---|---|
| | | Resin extraction time$^a$, hours | Solvent hold-up$^b$ | | | |
| Portion | Treatment | | Acetone | Cyclohexane | | |
| I | Fine ground, 300 μm. | 10 | 195 | 205 | 11.13 | 4.58 |
| II | Shear-flaked, 30 μm. | 3 | 116 | 150 | 14.10 | 4.90 |
| III | Shear-flaked, 150 μm. | 4 | 104 | 125 | 12.14 | 5.20 |
| IV | Shear-flaked, 600 μm. | 4 | 78 | 106 | 12.43 | 4.78 |
| V | Coarse ground, 3.2 mm. | >24 | 96 | 101 | 9.44 | 2.49 |

$^a$Approximate time for complete extraction of green pigments; hence, nearly complete resin recovery.
$^b$Solvent which does not rapidly drain from the extracted residue, grams solvent per 100 g. original sample.

The solvent extraction may be conducted in either a single- or a multiple-step operation. It is generally preferred to extract the shaped particles with a first solvent which will selectively remove resinous components, and then extract the particles with a second solvent for removing the rubber or rubberlike polymeric hydrocarbons. Acetone as the first solvent and cyclohexane as the second solvent is the preferred combination, though it is understood that other solvent combinations would be readily apparent to a person of ordinary skill in the art. Alternatively, the resin and polymeric hydrocarbon substances may be removed by a single extraction with a universal solvent, such as cyclohexane. In either case, the desired components can then be recovered from the solvent by conventional means.

The following examples are intended only to further illustrate the invention and are not intended to limit the scope of the invention which is defined by the claims.

EXAMPLE 1

The starting material was a composite of several chopped whole air-dry Guayule shrubs. Its moisture content was 9.1%.

Portion I of this material was fine-ground in a Wiley mill with a 40-mesh screen, typical of prior art analytical treatment of plant produce for solvent extraction, and consisted of a fine powder of about 300-μm. average particle diameter.

Portion II of this material was fed to a standard rubber mill set at 0.001-inch nip opening, 24 r.p.m. slow roll speed, and 1.4 friction ratio. The shear rate at this nip opening was 3,100 sec.$^{-1}$. The material banded onto the roll at the initial pass and was removed by a doctor blade after a second pass as a coherent elastic sheet of about 30-μm. thickness. This sheet was cut into approximately 2-cm. flakes for solvent extraction.

Portion III was treated the same as Portion II except that the nip opening was 0.005 inch with a shear rate of 620 sec.$^{-1}$ giving flakes of about 150-μm. thickness and 2-cm. breadth.

Portion IV was fed to the rubber mill at the same settings used to treat portion II. It banded for two passes, then the sheet was removed, folded several times, and passed through the nip set at 0.020 inch opening with a shear rate of 155 sec.$^{-1}$ to give a final sheet about 600-μm. thick. This was cut into 2-cm. flakes.

Portion V was prepared by coarse grinding in a Wiley mill with a 6-mm. screen to give a coarse powder of about 3.2-mm. average particle diameter. This por- The above data illustrate the important advantages of the instant invention over the prior art in greatly improving extraction rates, decreasing solvent hold-up, and increasing yields. Though no drainage rate data are given in Table I, it should be noted that drainage rates are related to solvent hold-up so that the low solvent hold-up values, above, correlate with rapid drainage. These two parameters, i.e., drainage rate and solvent hold-up, are of great importance technically because they determine the efficiency of extraction and ease of solvent recovery, respectively.

The shear-flaked particles (Portions II, III, and IV) retained their shape throughout the extraction process but lost their elasticity and were reduced in cohesiveness by removal of resin and rubber binder. Thus, the fully extracted flakes were brittle, but did not crumble or become dusty unless severely handled.

EXAMPLE 2

The starting material was chopped whole air-dry Guayule of moisture content about 9.0% as in Example 1. Its analysis by extraction of fine-ground product was 9.99% resin (6.49% polyphenol fraction and 3.50% oil fraction) and 4.11% natural rubber.

Portion I was shaped into ⅜-inch diameter by ⅜-inch length pellets by extrusion processing. A 10/1 length-/diameter ⅜-inch extrusion head on a C. W. Brabender Plasticorder was employed with a 1/1 compression ratio screw. The extruder was operated at 50 r.p.m. and, although neither the screw nor die were externally heated, air-jacket cooling of the extruder was required to hold its temperature at 30° C. or below. A ⅜-inch rod die with a conical entrance section and a 2-inch die length was used. The screw had a tapered tip mated to the die entrance. Before processing began, the die was lubricated with a spray-on silicone release agent. Initial torque, just as extrusion from the die began, was 5,000 m.-g. Once extrusion began, a steady driving torque of only about 2,000 m.-g. was required with uniform feeding rate. The extruded product was a smooth-surfaced, compressed, dense, elastic rod of ⅜-inch diameter which was chopped to dustless, rubbery, coherent pellets.

Portion II was extrusion processed similar to portion I except that a ¼-inch rod die was used, and the resulting pellets were ¼-inch in diameter by ¼-inch in length. A torque maximum in excess of 5,000 m.-g. occurred at the start of extrusion but only about 3,000 m.-g. was required to maintain a good extrusion rate.

Portion III was first flaked by the same process as portion II of Example 1, then extruded in the same manner as portions I and II above except that the die opening was smaller to give ⅛-inch pellets. Initial torque was 4,900 m.-g., steady-state torque was 3,700 m.-g.

The above three portions were sequentially extracted with acetone and cyclohexane as in Example 1 and the results are given in Table II.

high-shear rolls as increased binder content. Recycling of binder is more needed for plants low in resin and rubber, but solvent extraction of such plants is of less economic interest.

It is understood that the foregoing detailed description is given merely by way of illustration and that modifications and variations may be made therein without departing from the spirit and scope of the invention.

Table III

| Plant species | Moisture content, % | Treatment | Resin extraction time, hours | Solvent hold-up | | Resin yield, % | | Rubber yield, % |
|---|---|---|---|---|---|---|---|---|
| | | | | Acetone | Cyclohexane | Polyphenols | Oils | |
| Apocynum cannabinum | 10.63 | fine-ground control | 14 | 197 | 210 | 7.7 | 4.48 | 1.01 |
| | 10.63 | shear-flaked, 80 μm. | 3 | 113 | 107 | 15.7 | 5.18 | 1.38 |
| Asclepias incarnata | 9.37 | fine-ground control | >4 | 230 | 236 | 10.4 | 2.70 | 1.69 |
| | 9.37 | shear-flaked, 80 μm. | 3 | 102 | 106 | 10.8 | 2.77 | 1.48 |
| Asclepias syriaca | 7.82 | fine-ground control | 12 | 206 | 198 | 10.3 | 3.98 | 1.21 |
| | 7.82 | shear-flaked, 80 μm. | 4 | 129 | 131 | 10.1 | 4.46 | 1.25 |
| Cacalia atriplicifolia | 6.29 | fine-ground control | >24 | 145 | 134 | 6.3 | 2.16 | 1.15 |
| | 6.29 | shear-flaked, 80 μm. | >10 | 130 | 125 | 8.7 | 2.99 | 1.49 |
| Solidago graminifolia | 6.10 | fine-ground control | 12 | 146 | 150 | 9.7 | 2.14 | 0.77 |
| | 6.10 | shear-flaked, 80 μm. | 8 | 127 | 127 | 9.8 | 2.03 | 1.15 |

Table II

| Portion | Treatment | Resin extraction time, hours | Solvent hold-up | | Resin yield, % | Rubber yield, % |
|---|---|---|---|---|---|---|
| | | | Acetone | Cyclohexane | | |
| I | Pelletized, ⅜-inch | 4 | 39 | 83 | 10.67 | 4.32 |
| II | Pelletized, ¼-inch | 3.5 | 61 | 72 | 9.64 | 4.42 |
| III | Shear-flaked, pelletized, ⅛-inch | 4 | 6 | 10 | 10.27 | 4.14 |

All three portions had remarkably good extraction characteristics and were cohesive throughout the extraction process. However, the portion III product, though somewhat more expensive to produce, was superior in both aspects. Using shear-flaked plant material as extruder feed allowed production of smaller pellets at lower drive torques and gave more compacted, more cohesive, and more free-draining products. Example 2 also illustrates that in general, extruder-pelletized products are superior to shear-flaked products.

EXAMPLE 3

Air-dry chopped whole plant samples of *Apocynum cannabinum*, *Asclepias incarnata*, *Asclepias syriaca*, *Cacalia atriplicifolia*, and *Solidago graminifolia* were shear-flaked by the same process as portion II in Example 1 except that the nip opening was 0.002 inch. The resultant flake thickness was 80 μm. These plants are representative of the many species being considered as potential hydrocarbon and rubber-producing crops. Their rubber contents are low but they are rich in other hydrocarbons and resins. Such plants are being referred to as potential "gasoline trees".

Each shear-flaked plant sample was sequentially extracted with acetone and cyclohexane as in the above examples with results given in Table III. In Table III, the acetone extract (resin) is given as two subfractions, a polyphenol fraction and an oil fraction. These materials may become industrially important as replacements for petrochemicals.

Although most of these plants gave less desirable shear-flakes then Guayule, they were nevertheless much superior to prior art fine-ground products in ease of extraction. Better flakes may be prepared from such plants by recycling part of their resin and rubber to the

I claim:

1. A process for extracting polymeric hydrocarbon substances, selected from the group consisting of rubber and rubberlike polymeric hydrocarbons, from fibrous plant materials containing the same, comprising the following steps:
   a. subjecting said plant materials to the simultaneous action of compressive and shear forces under nonaqueous conditions, wherein said forces are sufficient to reduce said fibrous plant material to comminuted fibrous matter and released polymeric hydrocarbon substances and to cause the comminuted fibrous matter and polymeric hydrocarbon substances to cohere into a plastic mass, and thereby producing said plastic mass;
   b. shaping the plastic mass into particles;
   c. extracting the polymeric hydrocarbon substances from the shaped particles with a solvent; and
   d. recovering said polymeric hydrocarbon substances.

2. The process as described in claim 1 wherein said shaped particles are flakes.

3. The process as described in claim 1 wherein said shaped particles are pellets.

4. The process as described in claim 1 wherein said particles are extracted with a first solvent for selectively removing resin, and subsequently extracted with a second solvent for removing said polymeric hydrocarbon substances.

5. The process as described in claim 4 wherein said first solvent is acetone and said second solvent is cyclohexane.

6. The process as described in claim 1 wherein said fibrous plant material is Guayule.

* * * * *